United States Patent [19]

Parmentier et al.

[11] Patent Number: 5,009,874

[45] Date of Patent: Apr. 23, 1991

[54] HYDROPHOBIC PRECIPITATED SILICA GRANULES

[75] Inventors: Francois Parmentier, Lyons; Jacques Persello, Montluel, both of France

[73] Assignee: Rhone-Poulenc Chimie, Courbevoie, France

[21] Appl. No.: 181,312

[22] Filed: Apr. 13, 1988

[30] Foreign Application Priority Data

Apr. 13, 1987 [FR] France .................. 87 05199

[51] Int. Cl.$^5$ .................................. C01B 33/14
[52] U.S. Cl. ...................... 423/335; 423/339; 501/154
[58] Field of Search .............. 423/335, 339; 501/53, 501/54, 55, 133, 154

[56] References Cited

U.S. PATENT DOCUMENTS

| | | | |
|---|---|---|---|
| 4,015,031 | 3/1977 | Reinhardt et al. | 427/213 |
| 4,273,589 | 6/1981 | Nauroth et al. | 106/308 Q |
| 4,308,074 | 12/1981 | Nauroth et al. | 106/309 |
| 4,409,356 | 10/1983 | Lagarde et al. | 524/492 |

FOREIGN PATENT DOCUMENTS

| | | |
|---|---|---|
| 0031288 | 7/1981 | European Pat. Off. |
| 2305390 | 10/1976 | France . |
| 2356596 | 1/1978 | France . |

OTHER PUBLICATIONS

Ferch. Article, Chem. Ing Tech, no translation.

*Primary Examiner*—Olik Chaudhuri
*Assistant Examiner*—Kenneth Horton
*Attorney, Agent, or Firm*—Burns, Doane, Swecker & Mathis

[57] ABSTRACT

Hydrophobic, essentially spheroidal precipitated silica particulates, well adapted as a reinforcing filler material for silicone elastomers, have a density of at least 0.15, a water wettability of at least 20% and a maximum water uptake of 5%.

9 Claims, No Drawings

HYDROPHOBIC PRECIPITATED SILICA GRANULES

BACKGROUND OF THE INVENTION

1. Field of the Invention

The present invention relates to novel hydrophobic, spheroidal, precipitated silica particulates, and to a process for the preparation thereof and its use as reinforcing filler material in silicone elastomers.

2. Description of the Prior Art

It is known to this art to use pyrogenic silica, in particular, as a reinforcing filler in hardenable organopolysiloxane compositions. However, pyrogenic silica has the disadvantage of being quite expensive.

This art has long sought to replace, at least in part, pyrogenic silica with the lower cost precipitated silica. Various processes have to date been proposed for the preparation of precipitated silica. These, however, are quite complex and entail the careful control of temperature, reagent concentration, pH values, and the like. Compare French Patent No. 1,352,354.

Attempts have also been made to improve the reinforcing properties of precipitated silica for silicone applications, by rendering the silica hydrophobic by means of an appropriate surface treatment (for example, by the use of silanes or silazanes). Hydrophilic silica materials rendered hydrophobic by such a treatment and suitable for silicone applications are described in French Patent No. 2,356,596.

These precipitated silicas may have advantageous properties; nonetheless, they may still prove to be insufficient in relation to their dielectric properties which are important for certain specific applications, such as cables.

Finally, in a general manner the incorporation of silica into silicones presents certain other problems. In effect, this incorporation is carried out in low shear mixers. For the proper introduction of the silica into the silicone paste, the silica must have a sufficient density.

On the other hand, it is advantageous to have a product that may be handled easily, which in this case implies good flowability.

SUMMARY OF THE INVENTION

Accordingly, a major object of this invention is the provision of improved hydrophobic silica particulates that are well adapted for the reinforcement of silicone elastomers.

Another object of this invention is the provision of a simple and economical process for the preparation of such novel silica particulates.

Briefly, the hydrophobic precipitated silica particulates of the invention have the following properties:

| | |
|---|---|
| Density | at least 0.15 |
| Wettability by water | at least 20% |
| Water uptake | maximum 5% |

This silica is in the form of essentially spherical particulates, more particularly having an average particle size of at least 0.08 mm.

The process for the preparation of the subject novel silica particulates is characterized in that a silica suspension, a hydrophobizing agent and an organic solvent are intimately admixed, whereby a liquid phase and silica in the form of spheres are obtained, after which the liquid phase and the silica are separated and the latter optionally washed and dried.

DETAILED DESCRIPTION OF THE PREFERRED EMBODIMENTS OF THE INVENTION

More particularly according to the present invention, the novel silica particulates, by virtue of their density and spherical shape, are incorporated especially well into silicones. Thus, they represent a silicone filler material having favorable properties.

The various properties of the precipitated silica particulates according to the invention will now be described.

Firstly, the silica has a density of at least 0.15. This density value is the tapped density in accordance with AFNOR Standard No. 30100.

In different embodiments of the invention, this density may be at least 0.2, possibly at least 0.3 and more particularly it ranges from 0.2 to 0.4.

The silica according to the invention also has a wettability by water of at least 20%, preferably at least 30% and very preferably ranges from 40% to 80%.

This water wettability or hydrophobization index is determined by the volume V of methanol that must be added to a mixture consisting of 50 ml water and 200 mg $SiO_2$ to form a homogeneous suspension. The wettability or hydrophobization index I is expressed by the following equation:

$$I = [V/(V + 50)] \times 100$$

The silica of the invention further exhibits a water uptake of a maximum of 5% and more preferably a maximum of 3%.

This water uptake represents the amount of water absorbed by a silica sample under a given relative humidity.

In the present case, the uptake of water was measured as follows:

Initially, the sample is subjected to desorption at 120° C. under a flowstream of nitrogen until a constant weight is attained. It is then cooled under a flowstream of dry nitrogen to 23° C. Subsequently, dry nitrogen saturated with water vapor is passed over the sample under conditions such that the temperature of the sample always remains at 23° C. and the relative humidity at the level of the sample is 64%. The uptake is measured by the weight of the sample in percent relative to the dry product.

Another important property of the silica is the shape in which it is produced. It is in the form of essentially spherical shaped articles having a median size (median size by weight) of at least 0.08 mm. This size is preferably at least 0.2 mm and advantageously ranges from 0.2 to 2 mm. This shape imparts excellent flowability to the product of the invention.

The silica according to the invention preferably has a residual sodium content of a maximum 1500 ppm and more preferably a maximum of 500 ppm. This content corresponds to total sodium values. It is measured by flame spectro-emission after dissolution of the silica in hydrofluoric acid.

The silica of the invention may have a BET surface area varying over wide limits and typically is at least 50 $m^2/g$. Preferably, it ranges from 50 to 350 $m^2/g$ and more preferably from 100 to 300 $m^2/g$.

This surface area is determined by the BRUNAUER-EMMETT-TELLER method described in the *Journal of the American Chemical Society*, Vol. 60, p. 309, Feb. 1938 and is in accordance with NF T 45007 (5.11.1) standard.

The CTAB surface area of the silica again may vary over wide limits. Generally, it is at least 40 m$^2$/g. More particularly it ranges from 40 to 320 m$^2$/g and preferably from 80 to 270 m$^2$/g.

This CTAB surface is the external surface area determined by the absorption of trimethyl cetyl ammonium at pH 9, by the method described by JAY, JANSEN AND G. KRAUS in *Rubber Chemistry and Technology*, 44 (1971), pp. 1287–1296.

The process for the preparation of the spheroidal silica particulates according to the invention will now be described.

The process begins with an aqueous silica suspension that may be obtained in any manner.

It may, for example, be a suspension produced by the precipitation of a solution of an alkaline silicate neutralized by an acidic agent such as sulfuric acid or gaseous carbon dioxide. It may also be a filter cake of silica pulp.

It will be appreciated that according to the process of the invention the dry solids content of the suspension is not critical.

The process of the invention also employs a hydrophobizing agent.

Any known agent capable of rendering the surface of silica hydrophobic may be used. Compare, for example, *Encyclopedia of Chemical Technology*, Third Ed., Vol. 20, p. 962ff.

Organosilicic compounds, such as those of the general formula: $(R_3Si)_aZ$ may be used, wherein R is a monovalent hydrocarbon radical, identical or different, optionally substituted, and/or polymers thereof; a is equal to 1 or 2 and Z is a halogen or —OH, —OR, —NRX, —ONR$_2$, —SR, —OOCR, —O—, —N(X) or —S—, with R being as above defined and X is hydrogen or has the definition significance as R. Exemplary of such compounds, the following are representative:

trimethylsilane, trimethylchlorosilane, trimethylethoxysilane, triorganosilylaminoxy compounds, such as diethylaminotrioxytrimethylsilane and diethylaminoxydimethylphenylsilane, compounds of the type of triorganosilylmercaptans, triorganosilylacylates, triorganosilylamines.

Also representative are the chlorosilanes or alkoxysilanes, such as, for example, dimethyldichlorosilane, dimethyldiethoxysilane, dimethyldimethoxysilane.

Also useful are the disilazanes, such as hexamethyldisilazane and 1,3-diphenylhexamethyldisilazane.

It will be appreciated that it is possible to use a combination of several different hydrophobizing agents.

In one embodiment of the invention, the hydrophobizing agent is at least one alkylchlorosilane, in particular dimethyldichlorosilane and the combination of dimethyldichlorosilane, trimethylchlorosilane and methyltrichlorosilane.

The process of the invention also utilizes an organic solvent that is not miscible with water.

This solvent is preferably an ester or a ketone and, in particular, aliphatic derivatives of the former.

Exemplary of the aliphatic esters, the formates, acetates, propionates, butyrates, oxalates, phosphates and lactates are particularly representative.

The acetates are the preferred, specifically ethyl, diisopropyl or butyl acetate.

The aliphatic ketones may also advantageously be used, particularly methyl isobutyl ketone and ethyl isopropyl ketone.

Optionally, the amines may be used as the organic solvent, in particular primary and secondary amines, or mixture thereof with an organic diluent, for example of the aliphatic hydrocarbon type, or a chlorinated solvent may be used.

Preferably, the mixing of the silica suspension, the hydrophobizing agent and the solvent is carried out in the following manner:

In a first step, the silica suspension and the hydrophobizing agent are mixed together. The duration of this first step may vary over a wide range. As one example, it may last for one to two hours.

It is advantageous to maintain the pH of the mixture constant from this step on, whereby the release of noxious gas when halide derivatives are used as the hydrophobizing agent is prevented. At the end of this step, an aging period of the medium may be conducted for at least 5 min.

Subsequently, in a second step, the solvent is added to the medium. It is introduced under agitation.

The quantity of the hydrophobizing agent to be used varies as a function of the type of silica present in the initial solution and specifically as a function of its surface (BET surface). This quantity is also a function of the application for which the hydrophobic silica is intended.

The quantity of the solvent is also a function of the initial silica and its treatment. This quantity is generally such that the volume ratio of the solvent, expressed in liter/weight of silica in kg (calculated relative to the SiO$_2$ present in the suspension), varies from 1 to 5, preferably from 1.5 to 4.5.

There is a minimum quantity of solvent below which there is no agglomeration of the silica. There also exists a maximum amount, beyond which bonding of the formed granules occurs and a compact mass of silica is obtained.

As mentioned above, the mixing of the silica suspension, the hydrophobizing agent and the solvent effect the granulation of the silica.

The temperature at which the mixing is carried out may vary generally between ambient and 80° C. This temperature is frequently the temperature at which the initial silica suspension is obtained.

When the agitation of the reaction medium is terminated, a liquid phase and spheroidal silica are obtained.

The silica and the liquid phase may be separated by any known means, for example by band filtering or centrifuging.

Such separation is indeed quite easy; this is one of the advantages of the invention.

Following this separation, a silica having the properties given above is produced.

This silica may contain salts, such as, for example, sodium sulfate in the case of silica suspensions obtained by the neutralization of alkaline silicates with sulfuric acid.

Consequently, a further stage of the process may include a washing stage to eliminate the aforementioned impurities.

The washing process may be carried out using deionized water, which either may or may not be saturated with solvent. The process is effected easily, similar to filtration, for example directly on the filter cake. Very low residual sodium contents are thus attained.

The final product may then be dried by an known process.

The silica particulates produced in this manner are particularly suitable for use as reinforcing fillers for organosilicon compounds.

The nature of the organosilicon compounds that may be reinforced, after vulcanization, by the silica particulates of the invention is not critical. In general, the organosilicon compositions are elastomeric or pasty in nature.

In the case of elastomer compositions, the vulcanizable organosilicon compound is such that if R designates the hydrocarbon radicals bonded to the silicon atoms, the ratio of the total number of R radicals to the number of total silicon atoms ranges from 0.5 to 3. In the constitution of organosilicon polymers, the other available silicon valences are bonded to heteroatoms, such as oxygen or nitrogen, or to multivalent hydrocarbon radicals.

Preferably, the filled organosilicon compositions according to the invention are organic polysiloxane compositions in which the organic polysiloxane is linear or branched, and optionally may contain, in addition to the hydrocarbons radicals, certain reactive groups, such as, for example, hydroxyl groups, hydrolyzable groups, alkenyl groups, hydrogen atoms, etc.

More precisely, the organic polysiloxanes which constitute the principal components of the compositions according to the invention, include siloxane units of the following general formula:

$$R_nSiO_{(4-n)/2} \quad (I)$$

optionally combined with siloxane units of the formula:

$$Z_xR_ySiO_{(4-x-y)/2} \quad (II)$$

In these formulae the different symbols have the following significance:

R represents a nonhydrolyzable hydrocarbon group, which may be an alkyl or halogenated alkyl radical having 1 to 5 carbon atoms and containing 1 to 6 chlorine and/or fluorine atoms, a cycloalkyl or halogenated cycloalkyl radical having 3 to 8 carbon atoms and containing 1 to 4 chlorine and/or fluorine atoms, an aryl, alkylaryl or halogenated aryl radical having 6 to 8 carbon atoms and containing 1 to 4 chlorine and/or fluorine atoms, or a cyanoalkyl radical having 3 to 4 carbon atoms; Z is a hydrogen atom, an alkenyl group, a hydroxyl group, a hydrolyzable atom, or a hydrolyzable group; n is an integer equal to 0, 1, 2 or 3; x is an integer equal to 0, 1, 2 or 3; and y is an integer less than or equal to 2.

The following are representative of such organic radicals directly bonded to the silicon atoms:

methyl; ethyl; propyl; isopropyl; butyl; isobutyl; alpha-pentyl; t-butyl; chloromethyl; dichloromethyl; alphachloroethyl; alpha,beta-dichloroethyl; fluoromethyl; difluoromethyl; alpha,beta-difluoroethyl; 3,3,3-trifluoropropyl; trifluorocyclopropyl; 4,4,4-trifluorobutyl; 3,3,4,4,5,5,5-heptafluoropentyl; beta-cyanoethyl; gammacyanopropyl; phenyl; p-chlorophenyl; m-chlorophenyl; 3,5dichlorophenyl; trichlorophenyl; tetrachlorophenyl; o-, p- or m-tolyl; alpha,alpha,alpha-trifluorotolyl; xylyls, such as 2,3-dimethylphenyl; 3,4-dimethylphenyl; and the like.

Preferably, the organic radicals bonded to the silicon atoms are methyl, phenyl or vinyl radicals; these radicals may optionally be halogenated or may be cyanoalkyl radicals.

The symbols Z are advantageously hydrogen, chlorine atoms, vinyl groups, hydroxyl groups or hydrolyzable groups, such as amino, amido, aminoxy, oxime, alkoxy, alkoxyalkoxy, alkenyloxy, acyloxy groups, and the like.

The nature of the organic polysiloxane and thus the ratios of the siloxane units (I) and (II) and their distribution are selected in known manner as a function of the intended application and of the vulcanization treatment to which the composition is to be subjected.

They may, therefore, include compositions vulcanizable at elevated temperatures under the action of organic peroxides, such as 2,4-dichlorobenzoyl peroxide, benzoyl peroxide, t-butyl perbenzoate, cumyl peroxide, di-t-butyl peroxide, and the like.

The organopolysiloxane comprising such compositions includes essentially only siloxane units (I) and contains no hydrolyzable groups or atoms.

The polymethylpolysiloxanes terminated by trimethylsilyl end groups constitute a particularly preferred embodiment of the invention on an industrial level.

Vulcanization may also be carried out at ambient temperature or at a moderate temperature by effecting cross-linking between vinylsilyl groups and hydrogenosilyl groups, with the hydrosilylation reaction being conducted in the presence of catalyst, such as platinum derivatives; the organic polysiloxanes then contain no hydrolyzable atoms or groups.

Vulcanization may be carried out under the action of humidity. The organic polysiloxanes contained in compositions of this type contain hydrolyzable atoms or groups, such as those defined above. The siloxane units (II) contained in such groups constitute at most 15% by weight of the total weight of the organic polysiloxanes employed. Organic polysiloxane compositions of this type generally contain catalysts, such as tin salts.

Finally, vulcanization may be carried out in the presence of crosslinking agents. The organic polysiloxanes comprising such compositions generally are linear, branched or crosslinked polysiloxanes consisting of units (I) or (II), wherein Z is a hydroxyl group and x is equal to at least 1. The crosslinking agent may be a polyfunctional silane such as methyltriacetoxysilane, isopropyltriacetoxysilane, vinyltriacetoxysilane, trimethyl(diethylaminoxy)silane. Various other compounds, e.g., the silicates may also be used as crosslinking agents.

The organosilicon compositions according to the invention contain 5% to 50%, preferably 10% to 40% of the precipitated silica particulates optionally treated as described above. In the case of silicone pastes, the proportion of the novel silica particulates according to the invention generally ranges from 3% to 20%.

The compositions may also contain, in addition to the polysiloxanes, the optionally treated silica, the crosslinking agents and crosslinking catalysts, conventional fillers, such as pulverized quartz, diatomaceous earth, talc, carbon black, carbonates, and the like. The compositions may also contain different conventional additives, such as antistructural agents, heat stabilizers, thixotropic agents, pigments, corrosion inhibitors, etc.

The antistructural agents, also known as plasticizers, are generally organosilicon in nature and are introduced in a proportion of 0 to 20 parts per 100 parts of the organosilicon gum. They make it possible to prevent the hardening of the compositions during storage. Among such antistructural agents, the silanes with hydrolyzable groups of low molecular weight, and the hydroxyl or alkoxy diorganopolysiloxane oils are representative. Such compositions are described, for example, in French Patent No. 1,111,969.

Among the heat stabilizers well known to this art, the salts, oxides and hydroxides of iron, cerium or manganese are exemplary. These additives, which may be used alone or in admixture, are generally introduced in a proportion of 0.01 to 5% relative to the weight of the organopolysiloxane gum.

The organopolysiloxane compositions are prepared by mixing together the different ingredients thereof, as described above. The mixture may be prepared at ambient temperature, or hot.

In order to further illustrate the present invention and the advantages thereof, the following specific examples are given, it being understood that same are intended only as illustrative and in nowise limitative.

EXAMPLE 1

Into a 200 l reactor equipped with a pH and temperature control system, under agitation (turbine, 140 rpm), 60 liters of deionized water and 35 kg of a silica slurry containing 25% by weight of silica, were introduced.

The reaction medium was homogenized and the temperature was increased to 60°C.

The pH was then stabilized and pure dimethyldichlorosilane was simultaneously introduced at a rate of 113 g/min over 25 min with a sodium hydroxide solution (200 g/l) at a rate such as to maintain the pH at the value of 8.

The reaction medium was permitted to stand for 1 hr at 60° C. and then the pH was lowered to 6 by the addition to dimethyldichlorosilane.

Subsequently, 18 l methylisobutylketone were added to the reaction mixture over 10 min under agitation using a MIXEL screw at 170 rpm, which caused the silica to granulate. The suspension was filtered and washed with water. The final product silica particulates were dried in an oven at 90° C. under a pressure of 50 mm Hg for 18 hr.

The silica particulates were spheroidal in configuration and had the following properties:

| (a) | Density | 0.22 |
|---|---|---|
| (b) | Wettability | 70% |
| (c) | Water uptake | 3% |
| (d) | Median size | 2 mm |
| (e) | Sodium content | 440 ppm |
| (f) | BET surface | 170 m$^2$/g. |

EXAMPLE 2

Into the reactor of the preceding example, 60 liters of deionized water and 35 kg of a silica slurry, containing 25% by weight of silica, were introduced.

The mixture prepared in this manner was homogenized under agitation (140 rpm) and at ambient temperature.

The pH was adjusted to 4 and dimethyldichlorosilane was simultaneously added, at a rate of 113 g/min, with a NaOH solution (200 g/l), by adjusting the flow rate such that a constant pH value of 4 was maintained. These additions were continued for 20 min.

The reaction medium was heated to 60° C. and was aged for 20 min.

The process was continued as in Example 1 and the resulting spheroidal silica particulates had the following properties:

| (a) | Density | 0.26 |
|---|---|---|
| (b) | Wettability | 70% |
| (c) | Water uptake | 3% |
| (d) | Median size | 2 min |
| (e) | Sodium content | 440 ppm |
| (f) | BET surface | 170 m$^2$/g |

EXAMPLE 3

Into a 1 liter autoclave, 600 ml water and 150 g precipitated silica having a BET surface of 170 m$^2$/g were introduced. 30 g dimethyldimethoxysilane were added. The mixture was heated to 190° C. over two hours. It was then permitted to cool.

Subsequently, 0.35 l ethyl acetate was added over 10 min under agitation by MIXEL screw at 170 rpm, which caused the silica to granulate. The process was then continued as in Example 1.

The final product spheroidal silica particulates had the following properties:

| (a) | Density | 0.22 |
|---|---|---|
| (b) | Wettability | 45% |
| (c) | Water uptake | 4% |
| (d) | Median size | 2 mm |
| (e) | Sodium content | 200 ppm |
| (f) | BET surface | 170 m$^2$/g |

EXAMPLE 4

This example illustrates the dielectric properties, per plate, of products reinforced with a silica according to Example 1 and with a pyrogenic silica marketed by Degussa under the trademark AEROSIL.

Preparation of the organopolysiloxane composition:

Using a two cylinder laboratory mixer, the following ingredients were mixed together:
 (i) 50 g of a polydimethylsiloxane gum,
 (ii) 3.6 g of an antistructural agent (plasticizer),
 (iii) 20 g silica.

The polydimethylsiloxane gum was a devolatilized gum containing 720 mg Si groups per kg and terminating in trimethylsiloxy units. Its viscosity at 25° was 20 × 10$^6$ centipoises, corresponding to a molecular weight on the order of 6 × 10$^5$.

The antistructural agent was a hydroxylated polydimethylsiloxane containing 8.3% hydroxyl groups.

The mixing was carried out by adding the silica, over 5 min, in portions to the siloxane polymers; kneading in a calender was continued for 15 min prior to adding to the composition prepared in this manner 0.25 cm$^3$ of 2,5-dimethyl-2,5-di(tert-butylperoxy)hexane. The resulting mixture was then homogenized for 5 min on the same calender.

The mixture was then placed in a mold designed to form test specimens having a thickness of 2 mm.

The mold was preheated and the vulcanization of the mixture was carried out over 10 min at 170°C. under a pressure of 120 kg/cm$^2$.

The elastomers were studied in this condition and the transverse resistivity measured on the specimens obtained by detecting the current passing through the insulation between the measuring electrodes, and which is independent of the dimensions of said insulation (for a given insulator, this resistivity $\Omega$ varies from $10^2$ to $10^{16}$ $\Omega$ cm, approximately). The measurement was carried out according to the NFC 26215 standard.

The results were as follows:

| Aerosil | Silica of Invention |
|---|---|
| $\rho\, \Omega\, 10^{15}$ | $8 \cdot 10^{14}$ |

From the foregoing, it will be seen that the precipitated silica particulates of the invention present, as regards transversal resistivity, values closely approximating those obtained using pyrogenic silica.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. Hydrophobic, essentially spheroidal precipitated silica granules having a median particle size of at least 0.08 mm, a density of at least 0.15, a water wettability of at least 20%, and a maximum water uptake of 5%.

2. The precipitated silica granules as defined by claim 1, having a density ranging from 0.2 to 0.4.

3. The precipitated silica granules as defined by claim 1, having a water wettability of at least 30%.

4. The precipitated silica granules as defined by claim 3, having a water wettability ranging from 40% to 80%.

5. The precipitated silica granules as defined by claim 1, having a maximum water uptake of 3%.

6. The precipitated silica granules as defined by claim 1, having a water uptake ranging from 1.5% to 3%.

7. The precipitated silica granules as defined by claim 1, having a median particle size ranging from 0.2 to 2 mm.

8. The precipitated silica granules as defined by claim 1, having a BET surface area of at least 50 $m^2/g$ and a CTAB surface area of at least 40 $m^2/g$.

9. The precipitated silica granules as defined by claim 8, having a BET surface area of from 50 to 350 $m^2/g$ and a CTAB surface area of from 40 to 320 $m^2/g$.

* * * * *